(12) United States Patent
Moon

(10) Patent No.: US 11,345,514 B2
(45) Date of Patent: May 31, 2022

(54) LIQUID STORAGE CONTAINER

(71) Applicants: HYUNDAI MOTOR COMPANY, Seoul (KR); KIA MOTORS CORPORATION, Seoul (KR)

(72) Inventor: Kee Hoon Moon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 5 days.

(21) Appl. No.: 17/109,949

(22) Filed: Dec. 2, 2020

(65) Prior Publication Data

US 2022/0017267 A1 Jan. 20, 2022

(30) Foreign Application Priority Data

Jul. 15, 2020 (KR) .......................... 10-2020-0087179

(51) Int. Cl.
*B65D 25/56* (2006.01)
*F01N 3/20* (2006.01)

(52) U.S. Cl.
CPC ........... *B65D 25/56* (2013.01); *F01N 3/2066* (2013.01); *B65D 2203/04* (2013.01); *F01N 2610/02* (2013.01); *F01N 2610/1413* (2013.01); *F01N 2900/1814* (2013.01)

(58) Field of Classification Search
CPC combination set(s) only.
See application file for complete search history.

(56) References Cited

U.S. PATENT DOCUMENTS

| | | | |
|---|---|---|---|
| 6,172,746 B1 * | 1/2001 | Byrne | G01N 21/4133 356/135 |
| 7,647,767 B2 * | 1/2010 | Osaku | F01N 3/2066 60/286 |
| 8,137,625 B2 * | 3/2012 | Sasanuma | G01N 27/18 422/82.02 |
| 8,934,102 B2 * | 1/2015 | Wirthlin | G01N 21/85 356/448 |
| 9,733,182 B2 * | 8/2017 | DiFoggio | E21B 47/10 |

(Continued)

FOREIGN PATENT DOCUMENTS

| | | |
|---|---|---|
| KR | 20-0203859 B | 9/2000 |
| KR | 10-0569949 B | 4/2006 |

(Continued)

*Primary Examiner* — Binh Q Tran
(74) *Attorney, Agent, or Firm* — Lempia Summerfield Katz LLC

(57) ABSTRACT

Disclosed is a liquid storage container which has an inspection window to check the completely filled state of the liquid storage container with a liquid injected thereinto and inhibit occurrence of a detection error of an optical concentration sensor due to light flowing into the liquid storage container through the inspection window. The liquid storage container includes a container main body configured to store the liquid, an inlet configured to inject the liquid into the container main body therethrough, the inspection window installed on the container main body and to confirm the completely filled state of the container main body with the liquid, a concentration sensor configured to detect the concentration of the liquid in the container main body, and a light blocking device installed in the container main body to block light entering through the inspection window.

16 Claims, 10 Drawing Sheets

(56) References Cited

U.S. PATENT DOCUMENTS

| | | | |
|---|---|---|---|
| 10,077,698 B2* | 9/2018 | Nihongi | F01N 9/00 |
| 2018/0281584 A1* | 10/2018 | Eulitz | B60K 15/03 |
| 2018/0326838 A1* | 11/2018 | Wolf | F01N 3/208 |

FOREIGN PATENT DOCUMENTS

| | | |
|---|---|---|
| KR | 10-0939016 B | 1/2010 |
| KR | 10-1323534 B | 10/2013 |
| KR | 10-1437118 B1 | 9/2014 |

* cited by examiner

LIQUID STORAGE CONTAINER

CROSS-REFERENCE TO RELATED APPLICATION

This application claims priority to and the benefit of Korean Patent Application No. 10-2020-0087179, filed on Jul. 15, 2020, the entire contents of which are incorporated herein by reference.

FIELD

The present disclosure relates to a liquid storage container.

BACKGROUND

The statements in this section merely provide background information related to the present disclosure and may not constitute prior art.

Recently, environmentally friendly technologies to reduce environmental pollution are spotlighted, and environmentally friendly vehicles are being vigorously developed.

Internal combustion engine vehicles using gasoline or diesel fuels are being widely used.

In general, when an engine of a vehicle is operated, the engine emits exhaust gas, and particularly, a diesel engine emits exhaust gas including a large amount of harmful substances.

Particularly, exhaust gas emitted from a diesel engine vehicle using diesel fuel, such as a bus or truck, includes a large amount of nitrogen oxides ($NO_x$), which turn out to be a substance causing acid rain and respiratory diseases. According to recent exhaust gas regulation standards, nitrogen oxide emission standards are becoming more stringent.

In order to satisfy these emission standards, a method for reducing nitrogen oxides included in exhaust gas from a diesel engine by applying a selective catalytic reduction (SCR) system to a vehicle is known.

The SCR system, which removes nitrogen oxides from exhaust gas by reducing the nitrogen oxides into nitrogen and water using a urea solution as a catalyst, is widely used in large vehicles, such as trucks.

The SCR system must use the urea solution having an amount corresponding to about 4-6% of the amount of the fuel used to reduce nitrogen oxides, and the vehicle must be filled with the urea solution in the same manner as that in which the vehicle is filled with the fuel.

Therefore, it is desirable that a diesel engine vehicle includes a urea solution tank, separately in addition to a fuel tank, and a driver generally fills the urea solution tank with the urea solution when filling the fuel tank with the fuel.

A urea concentration sensor, for example, a urea quality sensor (UQS) configured to determine the quality of the urea solution and whether or not the urea solution is defective when the urea solution is injected into the urea solution tank, is installed in the urea solution tank, and the urea quality sensor (UQS) measures the concentration of urea in the urea solution and provides the measured concentration of the urea as information to determine whether or not the urea solution is pure.

Further, the urea quality sensor (UQS), which is used in feedback control in exhaust gas purification, is a regulated auto part. A warning of a cluster is turned on when the urea quality sensor (UQS) detects an abnormality.

As a representative example of known urea quality sensors, an optical urea quality sensor is known, and the optical urea quality sensor is configured to measure the concentration of urea by controlling an LED in a sensor housing to radiate light to the urea solution in the urea solution tank and allowing a photodetector, for example, a CMOS-line, of the sensor to measure an angle of refraction of light having passed through the urea solution serving as a medium.

When the urea solution is injected into the urea solution tank, it is difficult to recognize the completely filled state of the urea solution tank with the urea solution, and thus overflow of the urea solution through an inlet of the urea solution tank may frequently occur. As shown in FIGS. 1 and 2, a urea solution tank 1 has an inspection window 3 for confirming the level of a urea solution filling the inside of the urea solution tank 1 with the naked eye.

The urea solution not only causes corrosion of metal but also produces a chemical reaction causing crystallization, and thus, overflow of the urea solution through a tank inlet 2 may cause damages to other parts and inevitably cause loss of money due to filling the urea solution tank 1 with the urea solution when a large amount of the urea solution overflows.

The inspection window 3 formed of a transparent material is installed on the urea solution tank 1 to confirm the completely filled state of the urea solution tank 1 with the urea solution, thereby allowing a user to confirm the level of the urea solution through the inspection window 3 when the urea solution is injected into the urea solution tank 1.

Thereby, when the urea solution is injected into the urea solution tank 1, the user may easily recognize the completely filled state of the urea solution tank 1 with the urea solution and inject the urea solution into the urea solution tank 1 without overflowing.

However, when the transparent inspection window 3 is installed on the urea solution tank 1, light (visible light) enters the urea solution tank 1 through the inspection window 3, as shown in FIG. 1, and thereby, an optical urea solution quality sensor (UQS) 4 is exposed to the light and a detection error may occur.

FIG. 2 is a view illustrating an example in which the completely filled state of the urea solution tank 1 with the urea solution may be normally confirmed through the inspection window 3, when the urea solution is injected into the urea solution tank 1 in a state in which a vehicle is located on a flatland.

Referring to FIG. 2, it may be confirmed that the surface of the urea solution is normally located on a line 3a marked as "MAX" for indicating the level of the urea solution completely filling the urea solution tank 1.

FIGS. 3A and 3B are views exemplarily illustrating the completely filled states of the urea solution tank 1 with the urea solution, when the vehicle is located on a transverse slope or a longitudinal slope. In this case, as the vehicle and the urea solution tank 1 are inclined, the surface of the urea solution in the urea solution tank 1 is not normally located on the line 3a marked as "MAX" for indicating the level of the urea solution completely filling the urea solution tank 1.

Further, in a situation shown in the left portion of FIG. 4, even though the urea solution tank 1 is in a low capacity state, the surface of the urea solution may be viewed through the inspection window 3 and thus the user cannot recognize the low capacity state of the urea solution tank 1.

In addition, as shown in FIGS. 1 and 2, the inspection window 3 is formed of a transparent material and thus external light may enter the urea solution tank 1 through the inspection window 3, but the conventional solution tank 1 has no structure configured to inhibit light from entering the urea solution tank 1 through the inspection window 3.

Consequently, when visible light enters the urea solution tank 1 through the inspection window 3, a photodetector, for example, a CMOS-line, of the urea quality sensor 4 to determine the quality of the urea solution is exposed to the visible light and thus a detection error may occur.

It is desirable to block ultraviolet light around the urea quality sensor 4, and when the urea solution in the urea solution tank 1 is exposed to ultraviolet light through the inspection window 3, the concentration of the urea solution may be changed due to a chemical change.

Conventionally, as shown in FIG. 1, as light enters the urea solution tank 1 through the inspection window 3, a detection error of the urea quality sensor 4 frequently occurred, the warning light was turned on and the output and the speed of the vehicle were limited due to the detection error of the urea quality sensor 4, and thus a case in which the vehicle is not capable of being driven frequently occurred.

Light may be blocked by omitting the inspection window 3 but, in this case, when the urea solution is injected into the urea solution tank 1, it is difficult to recognize a time when the urea solution tank 1 is completely filled with the urea solution, and thus, overflow of the urea solution may frequently occur and marketability of the vehicle may be lowered.

The above information disclosed in this Background section is only for enhancement of understanding of the background of the disclosure and therefore it may contain information that does not form the prior art that is already known to a person of ordinary skill in the art.

SUMMARY

The present disclosure provides a liquid storage container which has an inspection window for confirming the completely filled state of the liquid storage container with a liquid injected thereinto.

In one aspect of the present disclosure, a liquid storage container includes: a container main body configured to store a liquid; an inlet configured to inject the liquid into the container main body therethrough; an inspection window installed configured on the container main body, and to confirm a completely filled state of the container main body with the liquid; a concentration sensor configured to detect a concentration of the liquid in the container main body; and a light blocking device installed configured in the container main body, and to block light entering through the inspection window.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
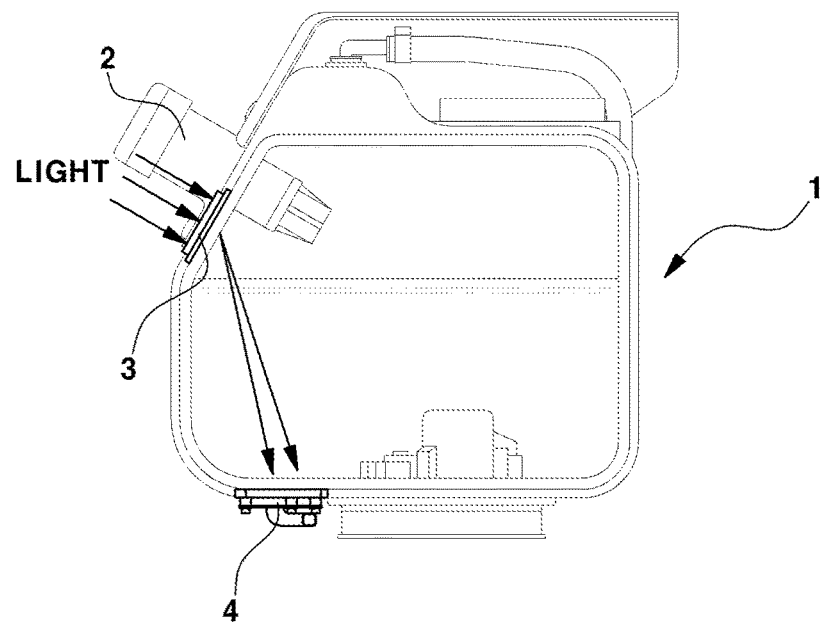
FIG. 1 is a view illustrating a conventional urea solution tank having an inspection window installed thereon.
Figure 2:
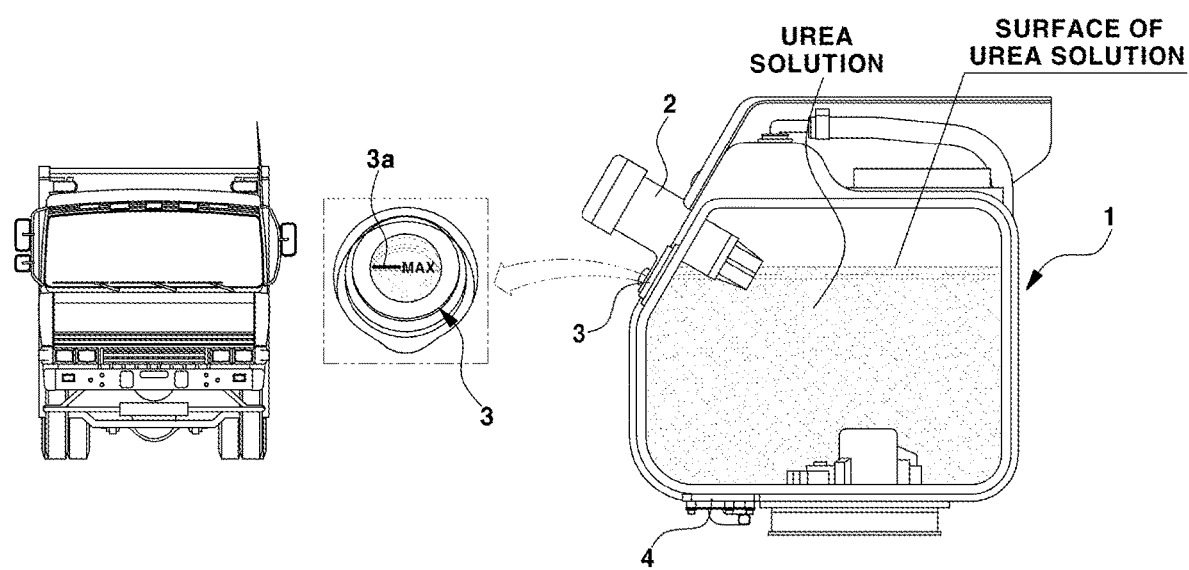
FIGS. 2, 3A and 3B are views exemplarily illustrating the states of a urea solution in the conventional urea solution tank, when a vehicle is located on a flatland, a transverse slope and a longitudinal slope, respectively.
Figure 3A:
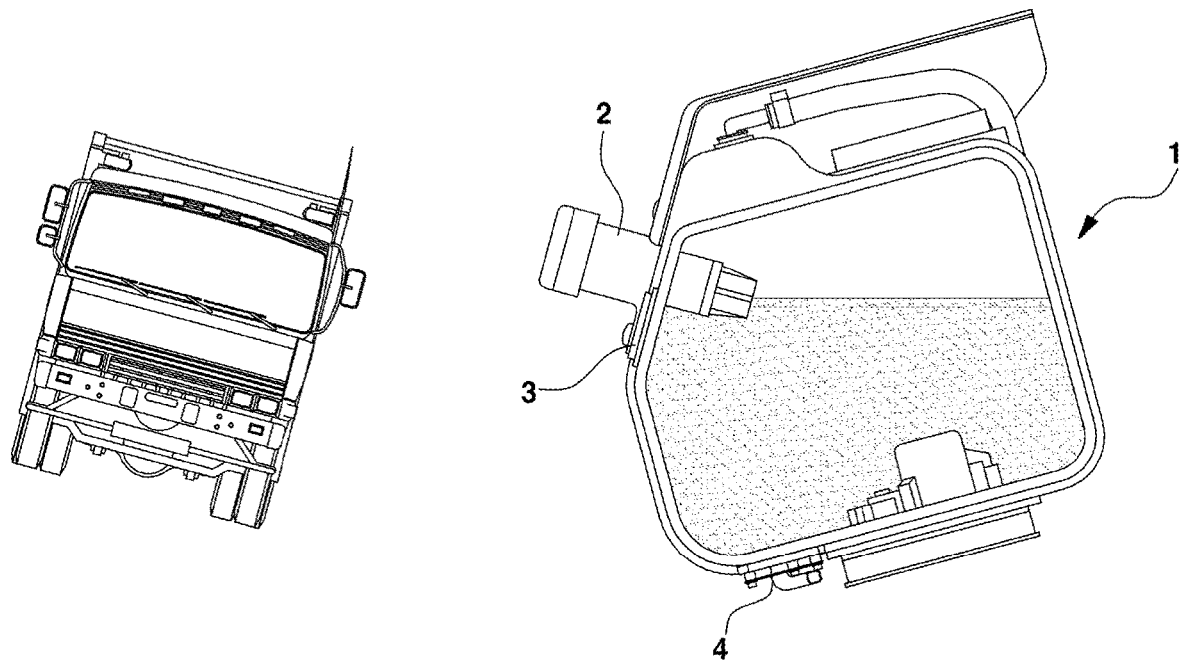
Figure 3B:
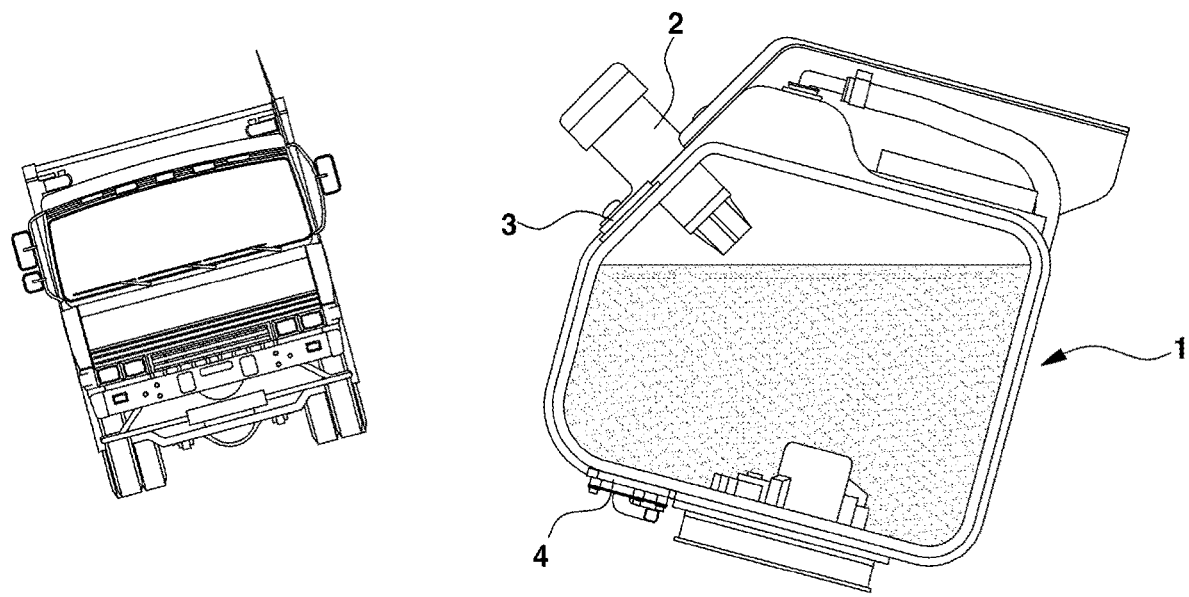
Figure 4:
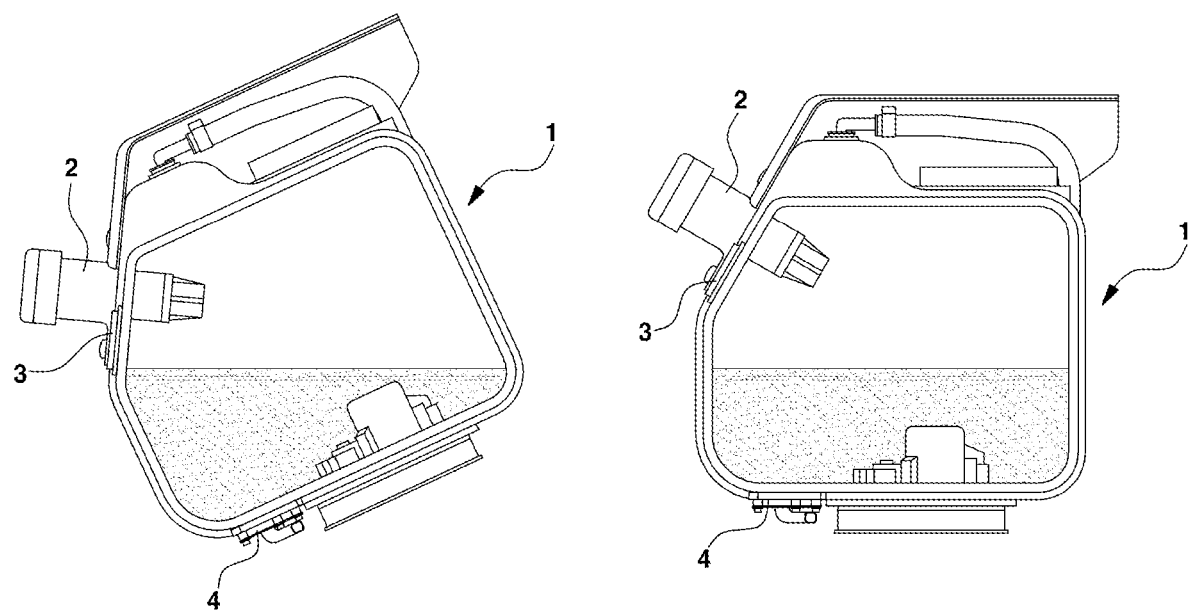
FIG. 4 is a view exemplarily illustrating the state of the urea solution in the conventional urea solution tank in a low capacity state, when the vehicle is located on a slope.

The drawings described herein are for illustration purposes only and are not intended to limit the scope of the present disclosure in any way.

DETAILED DESCRIPTION

Hereinafter reference will be made in detail to various forms of the present disclosure, examples of which are illustrated in the accompanying drawings and described below. While the present disclosure will be described in conjunction with exemplary forms, it will be understood that the present description is not intended to limit the present disclosure to the exemplary forms. On the contrary, the present disclosure is intended to cover not only the exemplary forms, but also various alternatives, modifications, equivalents and other forms, which may be included within the spirit and scope of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the following description of the exemplary forms, it will be understood that, when a part "includes" an element, the part may further include other elements, and does not exclude the presence of other elements unless stated otherwise.

The present disclosure relates to a liquid storage container into which a liquid is injected to be stored therein, and particularly, a liquid storage container which has an inspection window installed thereon for confirming the completely filled state of the liquid storage container with a liquid injected thereinto to ensure inhibit occurrence of a detection error of an optical concentration sensor due to light by using a light blocking device configured to block light entering the liquid storage container through the inspection window.

The liquid storage container according to the present disclosure may be a liquid storage container for vehicles having an optical concentration sensor configured to detect the concentration of a liquid filling the container, more particularly, the concentration of a specific ingredient in the liquid, and an inspection window configured to confirm the completely filled state of the container with the liquid.

In more detail, the liquid storage container may be a urea solution tank which is installed in a vehicle to be filled with a urea solution of an SCR system, and the optical concentration sensor may be a urea quality sensor configured to detect the concentration of urea in the urea solution filling the urea solution tank.

Here, the liquid is the urea solution, and the inspection window is an inspection window configured to confirm the completely filled state of the urea solution tank with the urea solution (referred to as "MAX inspection window").

If the urea quality sensor together with the inspection window is installed in the urea solution tank and a detection error of the urea quality sensor is capable of being effectively inhibited, whether or not the urea solution injected into the urea solution tank is defective may be accurately confirmed in addition to improving marketability and satisfying regulations, injection of a defective urea solution other than a pure urea solution may be inhibited, and various other features turning-on of a warning light, limiting of vehicle output, limiting of vehicle speed, non-driving of the vehicle, etc., caused by the detection error may be improved.

Further, when the inspection window is applied, a user may confirm a time at which the urea solution tank is completely filled with the urea solution and directly stop injecting the urea solution. Thus, a conventional valve device, such as a fill limit valve or a membrane valve, which is closed to mechanically stop injecting the urea solution when the urea solution tank is completely filled with the urea solution may be omitted, thereby being capable of achieving cost reduction.

In addition, the change in a material within a container due to exposure to visible light through a transparent inspection window may be inhibited.

Hereinafter, a liquid storage container according to one form of the present disclosure will be described with reference to the accompanying drawings.

Figure 5:
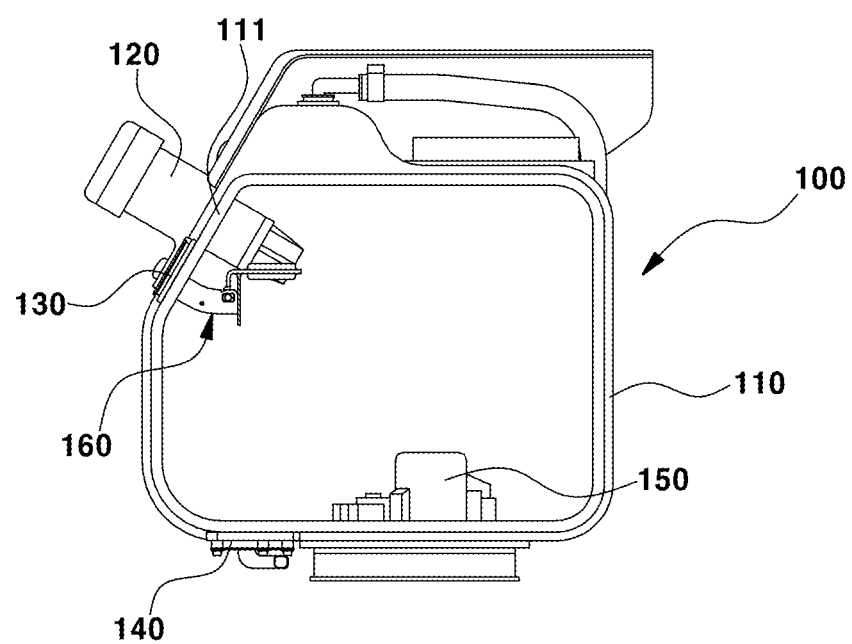
FIG. 5 is a cross-sectional view of a urea solution tank for vehicles as a liquid storage container according to one form of the present disclosure.
Figure 6:
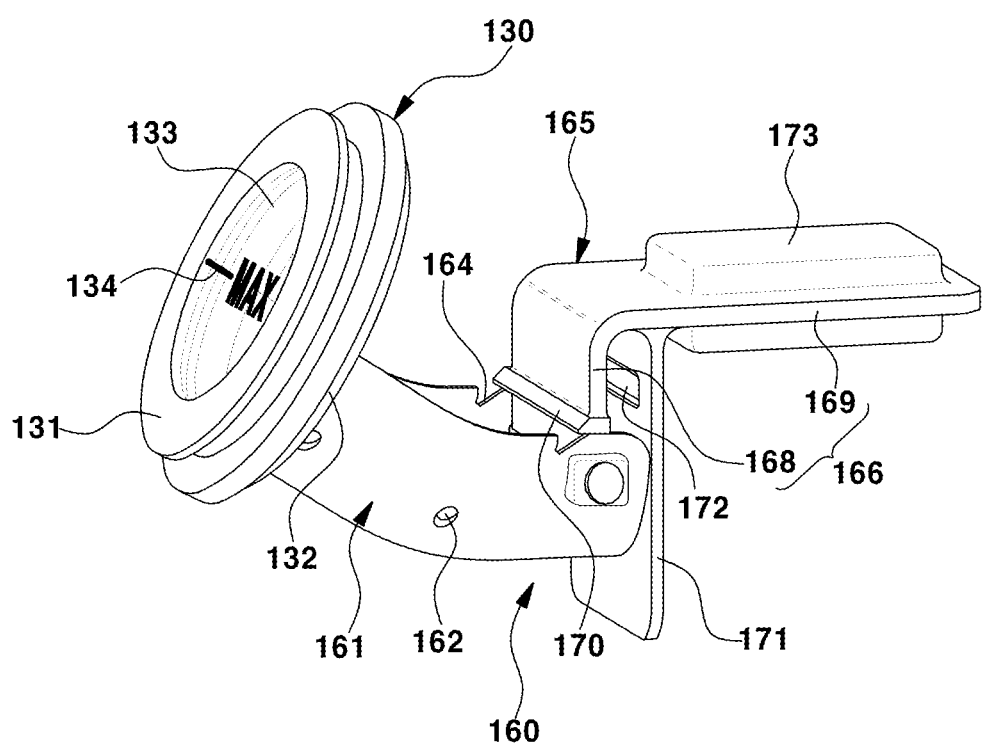
FIGS. 6 and 7 are perspective views illustrating an inspection window and a light blocking device of the urea solution tank according to one form of the present disclosure.
Figure 7:
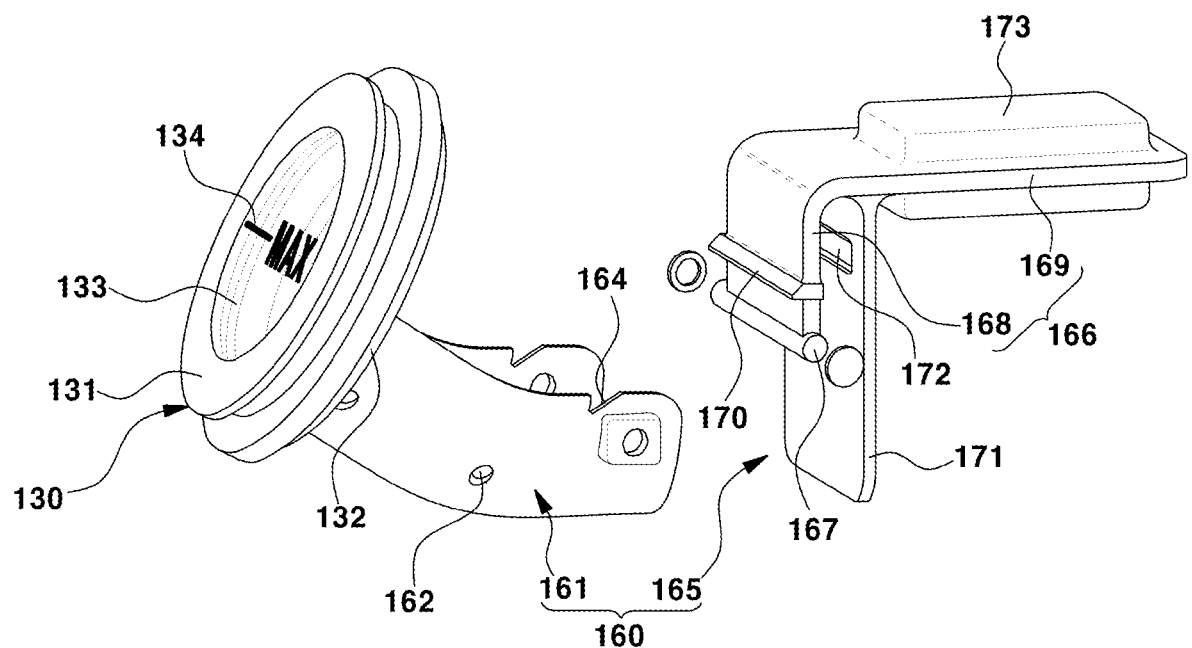

FIG. 5 is a cross-sectional view of a urea solution tank for vehicles as a liquid storage container according to one form of the present disclosure, and FIGS. 6 and 7 are perspective views illustrating an inspection window and a light blocking device of the urea solution tank according to one form of the present disclosure.

Figure 8:
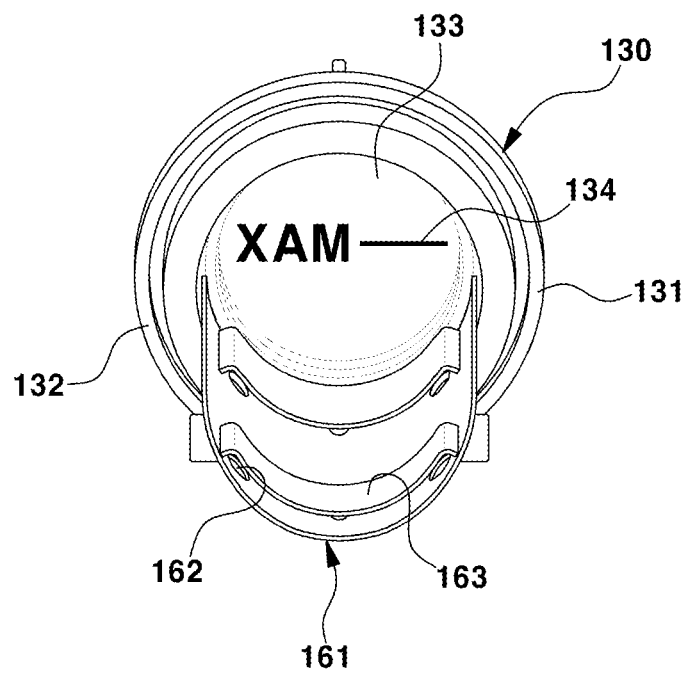
FIGS. 8 and 9 are perspective views illustrating a state in which the light blocking device according to one form of the present disclosure is fixed to the inspection window.
Figure 9:
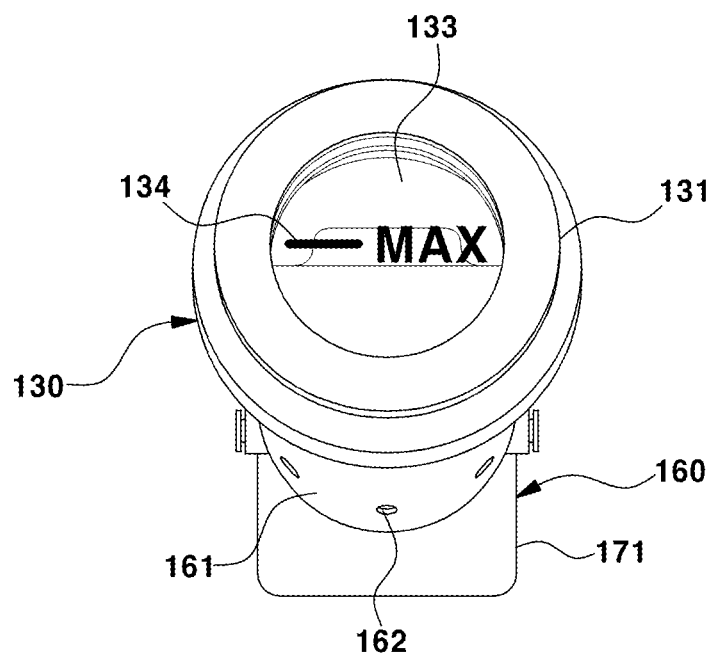

Further, FIGS. 8 and 9 are perspective views illustrating a state in which the light blocking device according to one form of the present disclosure is fixed to the inspection window.

Figure 10:
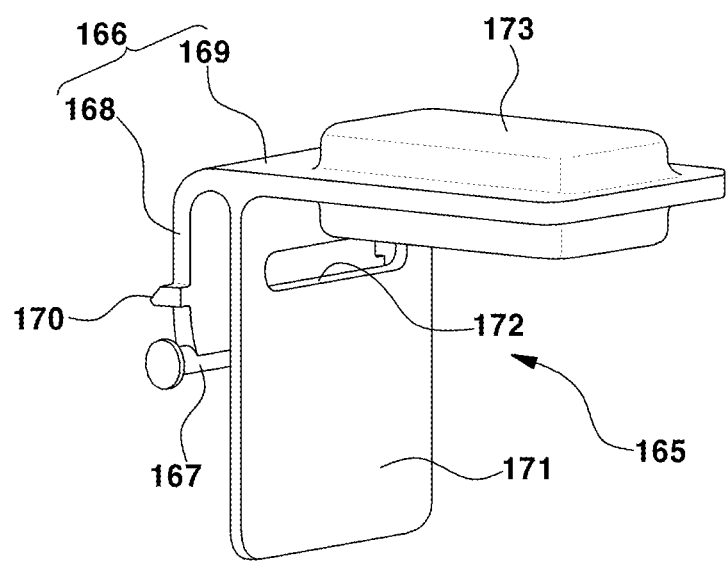
FIG. 10 is a perspective view illustrating a rotary blinder of the light blocking device according to one form of the present disclosure.

FIG. 10 is a perspective view illustrating a rotary blinder of the light blocking device according to one form of the present disclosure.

As shown in these figures, a urea solution tank 100 according to one form of the present disclosure may include a container main body 110 configured to have a designated volume and to form a storage space for storing a urea solution (a liquid) therein, an inlet 120 provided on the main body 10 to inject the urea solution into the main body 10 therethrough, an inspection window 130 installed on the container main body 110 to confirm the completely filled state of the urea solution tank 100 with the urea solution, and a urea quality sensor 140 installed in the container main body 110 to detect the concentration of the urea solution.

In addition, the urea solution tank 100 may further include a pump module 150 installed in the container main body, i.e., a urea solution tank main body, 110 to pump out the urea solution to supply the urea solution to a dosing module of an SCR system.

In one form, the urea solution tank 100 further includes a light blocking device 160 installed to block light which enters the container main body 110 through the inspection window 130 and then travels towards the urea quality sensor 140.

As shown in FIG. 5, the urea quality sensor 140 and the pump module 150 may be installed at the bottom portion of the container main body 110, and the inlet 120 and the inspection window 130 may be installed at the upper portion of the container main body 110.

Here, the inspection window 130 may be installed to be located under the inlet 120, and the light blocking device 160 may be coupled integrally to the inspection window 130 to be located inside the container main body 110.

The inspection window 130 may be installed at a sloped part 111, which is a wall part inclined at a designated angle, of the upper portion of the container main body 110, and in this case, the inspection window 130 may be installed at the sloped part 111 of the upper portion of the container main body 110 at the same angle of inclination as that of the sloped part 111.

The inspection window 130 includes a ring-shaped coupler 131 coupled to a mounting hole (not shown) formed through the container main body 110, and a window plate 133 formed of a transparent material and coupled to an inner portion of the coupler 131 to seal the mounting hole of the container main body 110 and to observe the inside of the container main body 110.

The coupler 131 of the inspection window may be circular ring-shaped, and the window plate 133 may be a transparent plate having an overall circular shape.

The window plate 133 may be manufactured using a transparent material, such as a synthetic resin or glass, and the coupler 131 becomes the edge portion of the inspection window 130 because the window plate 133 is coupled integrally to the inner circumferential portion of the coupler 131.

The coupler 131 has a bonding part 132 bonded to the circumference of the mounting hole, and the bonding part 132 of the coupler 131 may be bonded and fixed to the circumference of the mounting hole through a method, such as heat fusion.

Thereby, the inspection window 130 may be fixed to the mounting hole of the container main body 110 and, in the state in which the coupler 131 is bonded to the circumference of the mounting hole, the window plate 133 located inside the coupler 131 seals the mounting hole of the container main body 110.

A horizontal line 134 indicating the level of the urea solution completely filling the inside of the urea solution tank 100 is marked on the window plate 133, and letters "MAX" meaning the maximum level are marked beside the line 134.

In one form of the present disclosure, the light blocking device 160 includes a stationary blinder 161 disposed to extend towards the inside of the urea solution tank 100 (particularly, the container main body 110) to primarily block light entering through the inspection window 130 in a state in which one end of the stationary blinder 161 is coupled to the inspection window 130.

The stationary blinder 161 is located under the inspection window 130 within the container main body 110, thereby inhibiting light having passed through the inspection window 130 from traveling downwards, i.e., towards the urea quality sensor 140.

Here, the end of the stationary blinder 161 may be coupled to the lower portion of the inspection window 130, i.e., the portion of the coupler 131 located under the window plate 133, and, if the coupler 131 of the inspection window 130 has a circular ring shape, the stationary blinder 161 may be a plate having a semicircular or circular arc-shaped cross section, the upper surface of which is open.

Further, the stationary blinder 161 extends to have a designated length, and thus has a structure forming a long passage, the upper surface of which is open, in the container main body 110, and the bottom of the long passage serves to block light to inhibit the light from traveling under the inspection window 130.

As such, the stationary blinder 161 has a shield panel structure which is located under the inspection window 130 inside the container main body 110 and blocks light entering through the inspection window 130 to inhibit the light from traveling downwards.

When the light entering the container main body 110 through the inspection window 130 is blocked by the stationary blinder 161 so as not to travel downwards, the light does not travel downwards even if it has passed through the inspection window 130, thereby not influencing the urea quality sensor 140 located at the bottom portion of the container main body 110 or not causing a detection error of the urea quality sensor 140.

In one form of the present disclosure, the stationary blinder 161 may include a part which is inclined at a designated angle in a state in which one end thereof is coupled to the inspection window 130, and a part which extends approximately horizontally from the other end of the inclined part, as shown in FIG. 6.

Here, a rotary blinder 165 is rotatably coupled to the end of the horizontally extending part.

Further, liquid passage holes 162 are formed in the stationary blinder 161, and the liquid passage holes 162 serve as passages through which the urea solution injected into the container main body 110 flows between the inner passage space of the stationary blinder 161 and the outside of the stationary blinder 161.

That is, the urea solution in the container main body 110 may freely flow between the inner passage space of the stationary blinder 161 and the outside of the stationary blinder 161 through the liquid passage holes 162. When the urea solution freely flows through the liquid passage holes 162, the surface and the level of the urea solution inside the stationary blinder 161 becomes equal to the surface and the level of the urea solution outside the stationary blinder 161.

In one form of the present disclosure, a plurality of liquid passage holes 162 may be formed through the stationary blinder 161, and separate shield panels 163 which may cover the liquid passage holes 162 are installed on the upper surface of the stationary blinder 161.

Thereby, linear light having passed through the inspection window 130 is blocked by the shield panels 163 so as not to pass through the liquid passage holes 162 of the stationary blinder 161.

Further, in one form of the present disclosure, the light blocking device 160 may further include the rotary blinder 165 configured to additionally block light entering through the inspection window 30 in connection with the angle of inclination of the surface of the urea solution in the urea solution tank 100 (particularly, in the container main body 110) and the height of the surface (i.e., the level) of the urea solution.

In one form of the present disclosure, the rotary blinder 165 is rotatably coupled to the other end of the stationary blinder 151 by a hinge shaft 167 to be rotated in connection with the angle of inclination of the surface and the level of the urea solution.

The rotary blinder 165 is installed to block light traveling through the upper space of the stationary blinder 161 after passing through the inspection window 130. The rotary blinder 165 may be provided to block light in a downward oblique direction so that the light having passed through the inspection window 130 does not travel in the downward oblique direction regardless of whether or not the container main body 110 is inclined or the degree of inclination (i.e., the gradient) of the container main body 110.

Therefore, even when the vehicle is located on a flatland or a slope, the rotary blinder 165 may block light having passed through the inspection window 130 so that the light does not travel in the downward direction and the oblique direction.

In one form of the present disclosure, the rotary blinder 165 may include a first blinder 166 which is provided with one end rotatably hinged to the stationary blinder 161 by the hinge shaft 167 and extends from the stationary blinder 161 towards the inside of the container main body 110, and a second blinder 171 which extends downwards from the first blinder 166.

The first blinder 166 may be provided in a plate shape bent at one side thereof at a designated angle, for example, at an approximately right angle, and be disposed in a structure in which the first blinder 166 is coupled to the stationary blinder 161 at the hinge shaft 167 serving as a hinge coupling part, extends upwards and then extends laterally.

Further, the second blinder 171 is provided to extend downwards from a part 169 of the first blinder 166, laterally extending from a bent part 168 of the first blinder, i.e., the approximately horizontally extending part of the first blinder 166, and the upper end of the second blinder 171 is connected integrally to the lower surface of the laterally extending part (horizontally extending part) 169 of the first blinder 166.

Thereby, the first blinder 166 and the second blinder 171 form an integral rotary blinder 165, and the first blinder 166 and the second blinder 171 may be integrally rotated relative to the stationary blinder 161.

The first blinder 166 is configured to block light traveling through the upper space of the stationary blinder 161, and the second blinder 171 is configured to block light passing through the inner passage space of the stationary blinder 161 and light passing under the first blinder 166.

Figure 11:
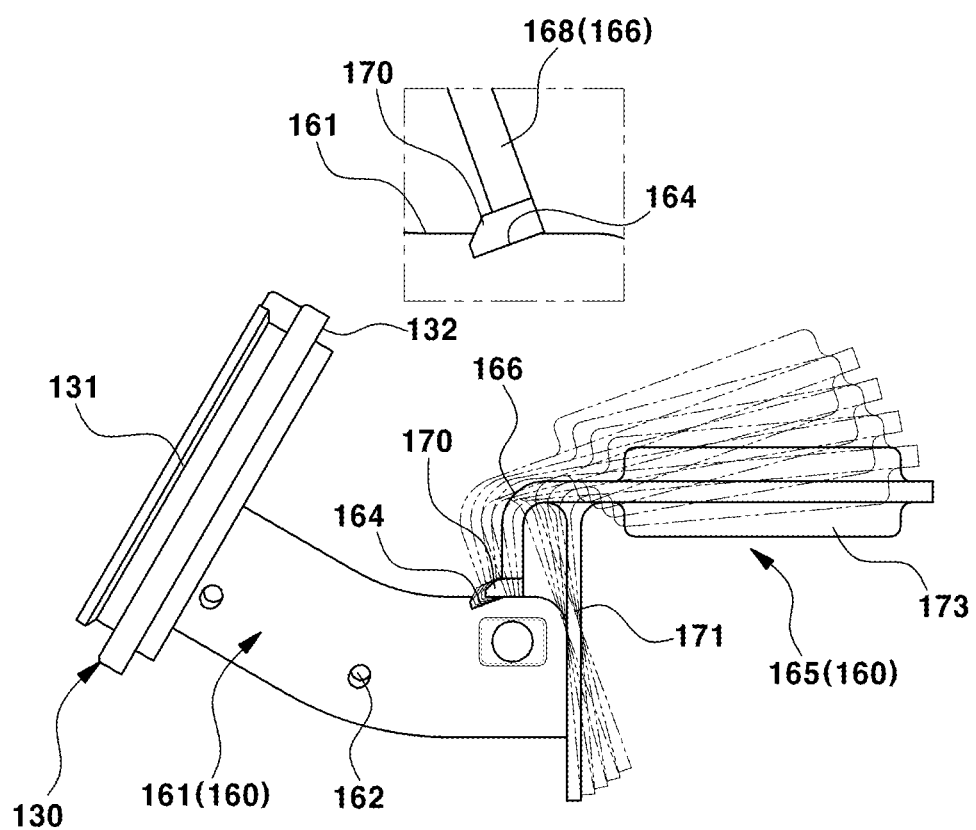
FIG. 11 is a view illustrating a state in which the rotary blinder of the light blocking device according to one form of the present disclosure is rotated.
Figure 12:
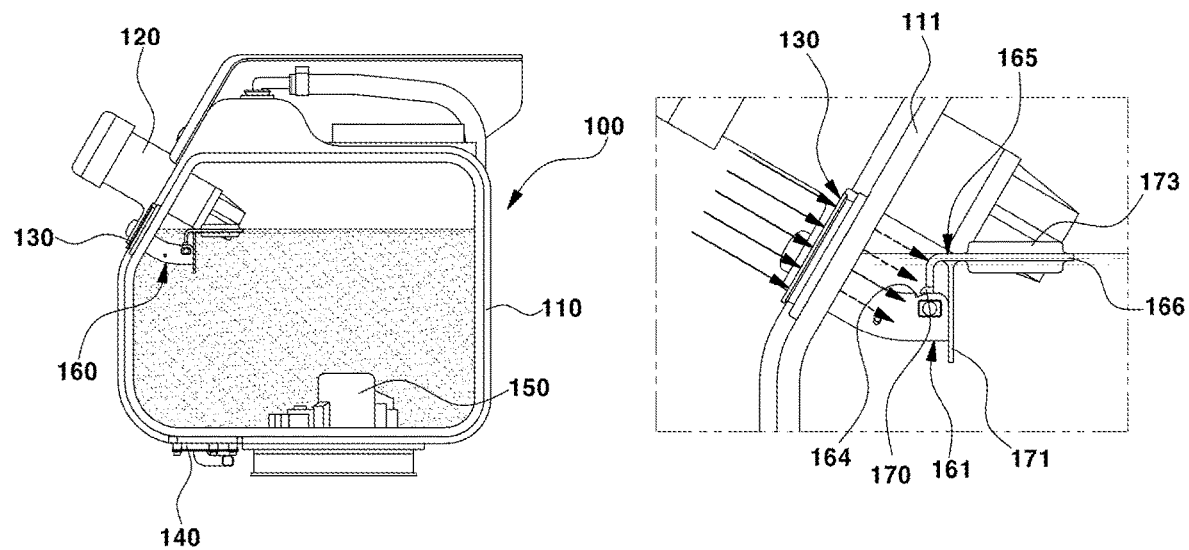
FIGS. 12, 13 and 14 are views illustrating states in which light is blocked by the light blocking device according to one form of the present disclosure.
Figure 13:
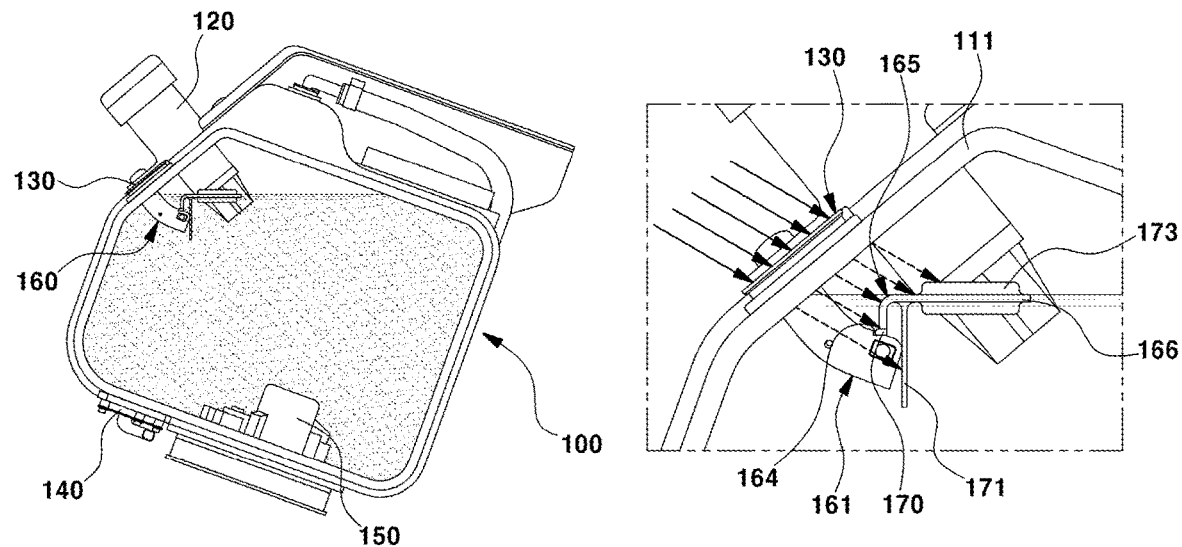

The second blinder 171 is configured to come into contact with the end section of the stationary blinder 161 and, when the entirety of the rotary blinder 165 including the second blinder 171 is rotated relative to the stationary blinder 161, as shown in FIG. 11, the second blinder 171 may come into contact with the end section of the stationary blinder 161 to close the inner passage space of the stationary blinder 161 (in FIGS. 12, 13 and 14), or may be spaced apart from the end section of the stationary blinder 161 to open the inner passage space of the stationary blinder 161 (in FIG. 13).

Further, a float 173 configured to float on the surface of the urea solution in the container main body 110 is provided integrally with the rotary blinder 165.

In the rotary blinder 165, the float 173 may be provided integrally with the first blinder 166, and have a structure having a vacant inner space filled with air.

A stopper 170 protruding in the lateral direction is formed at a position of one end of the first blinder 166 which is close to the hinge shaft 167 serving as the hinge coupling part to the stationary blinder 161, and regulation grooves 164 are formed at the other end of the stationary blinder 161 such that, when the first blinder 166 is rotated, the stopper 170 is inserted into the regulation grooves 164.

The regulation grooves 164 are configured such that, in a state in which the rotary blinder 165 including the first blinder 166 and the second blinder 171 is rotated at a predetermined angle, the stopper 170 inserted into the regulation grooves 164 may be engaged with the inner ends of the regulation grooves 164, and the regulation grooves 164 restrict the range of rotation of the rotary blinder 165 to inhibit the rotary blinder 165 from being rotated beyond the predetermined angle.

That is, the stopper 170 and the regulation grooves 164 serve to restrict the rotation of the rotary blinder 165 within the predetermined angle to inhibit the rotary blinder 165 from being undesirably rotated further.

FIG. 11 is a view illustrating a state in which the rotary blinder 165 of the light blocking device 160 according to one form of the present disclosure is rotated, and a state in which the rotation of the rotary blinder 165 is restricted by the stopper 170 and the regulation grooves 164.

Referring to FIG. 11, it may be confirmed that the rotary blinder 165 is rotated depending on the angle of inclination of the urea solution tank 100 or the level of the urea solution in the urea solution tank 100 while the float 173 floating on the surface of the urea solution moves upwards and downwards on the surface of the urea solution.

Further, referring to FIG. 11, it may be confirmed that the range of rotation of the rotary blinder 165 is restricted by the stopper 170 and the regulation grooves 164.

In the present disclosure, the surface of the urea solution stored in the container main body 110 moves upwards and downwards between the positions of the stationary blinder 161 and the rotary blinder 165 due to inclination of the container main body 110 and thus the level of the urea solution varies, and in this case, the float 173 provided integrally with the first blinder 166 also moves upwards and downwards on the surface of the urea solution.

When the float 173 moves upwards and downwards, the entirety of the rotary blinder 165 is rotated about the hinge shaft 167 serving as the hinge coupling part to the stationary blinder 161 and, when the rotary blinder 165 is rotated relative to the stationary blinder 161 and the stopper 170 is inserted into the regulation grooves 164 and then engaged with the inner ends of the regulation grooves 164, the rotary blinder 165 may not be rotated any further.

As such, the second blinder 171 blocking the end section of the stationary blinder 161 is not spaced far apart from the stationary blinder 161.

Further, when the urea solution tank 100 together with the vehicle is inclined on a slope, even if the float 173 moves upwards on the surface of the urea solution, the rotary blinder 165 may be rotated within the predetermined angular range, and the range of rotation of the rotary blinder 165 may be restricted to a designated range by the stopper 170 and the regulation grooves 164.

Alternatively, even if the surface of the urea solution in the container main body 110 is lowered and thus the float 173 moves downwards, the second blinder 171 comes into contact with the end section of the stationary blinder 161 and thus the rotation of the rotary blinder 165 in the opposite direction is also restricted.

When the vehicle is located on a slope, the angle of inclination of the urea solution tank 100 may vary, the angle of inclination of the surface of the urea solution or the level of the urea solution in the urea solution tank 100 may also vary, and the range of light entering through the inspection window 130 may vary, depending on the direction of the vehicle or the angle of the slope.

In one form of the present disclosure, the stationary blinder 161 of the light blocking device 160 primarily blocks light entering the urea solution tank 100 through the inspection window 130, and the rotary blinder of the light blocking device 160 is rotated depending on the angle of inclination of the urea solution tank 100, the angle of inclination of the surface of the urea solution in the urea solution tank 100, or the height of the surface or the level of the urea solution, and thus additionally blocks light within the urea solution tank 100.

In one form of the present disclosure, the rotary blinder 165 may be rotated within the predetermined range of rotation to effectively block light in the urea solution tank 100 and, if the rotary blinder 165 is rotated beyond the predetermined range of rotation, the rotary blinder 165 is not capable of blocking the light, and allows the light to pass.

Therefore, in the present disclosure, the rotation of the rotary blinder 165 is restricted within a predetermined range through engagement between the stopper 170 and the regulation grooves 164, and through contact and engagement between the stationary blinder 161 and the second blinder 171.

Further, when the second blinder 171 of the rotary blinder 165 comes into contact with the end section of the stationary blinder 161, the urea solution may be collected in the inner passage space of the stationary blinder 161.

Therefore, the stationary blinder 161 is installed to be inclined in the downward oblique direction, and liquid passage holes 162 and 173 serving as drain holes are formed through the stationary blinder 161 and the second blinder 171 of the rotary blinder 165.

The liquid passage holes 162 of the stationary blinder 161 have been described above, and the shield panels 163 configured to block the liquid passage holes 162 are separately installed on the upper surface of the stationary blinder 161 to inhibit light from passing through the liquid passage holes 162 of the stationary blinder 161, as described above.

Further, the second blinder 171 is disposed parallel to the end of the first blinder 166, and the liquid passage hole 172 is formed at a position of the second blinder 171 blocked by the end of the first blinder 166.

Accordingly, even when the urea solution tank 100 is inclined, the urea solution stored therein may freely flow through the liquid passage holes 162 of the stationary blinder 161 and the liquid passage hole 172 of the rotary blinder 165, and the urea solution is not collected in a specific region of the urea solution tank 100, for example, in the inner passage space of the stationary blinder 161, but may be smoothly discharged.

Figure 14:
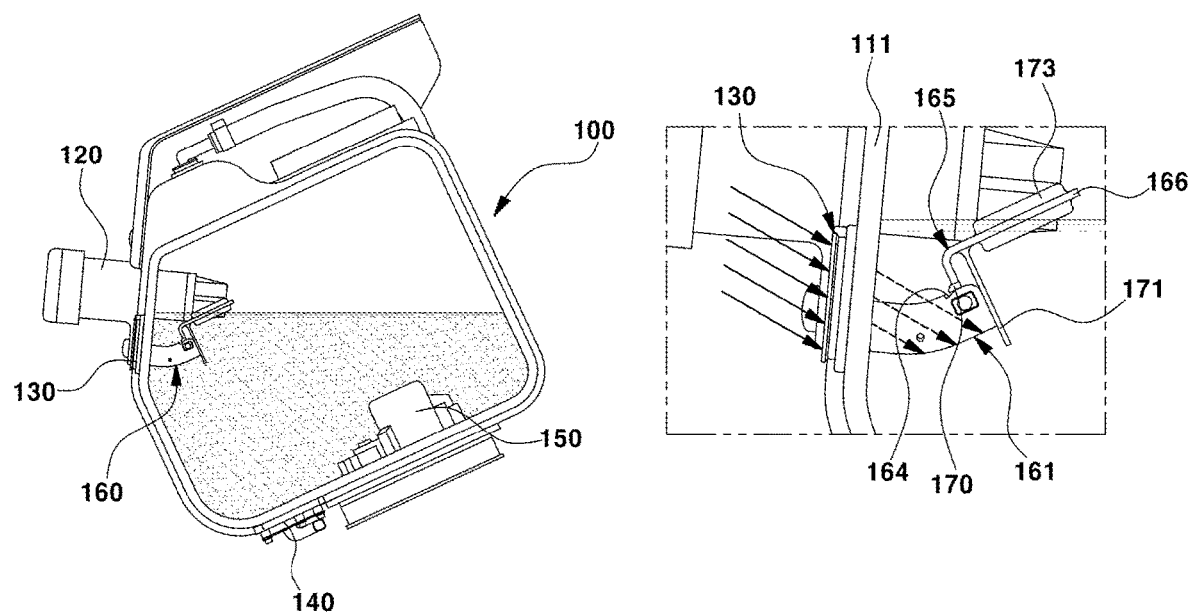

FIGS. 12, 13 and 14 are views illustrating states in which light is blocked by the light blocking device 160 according to one form of the present disclosure. FIG. 12 illustrates an example in which, when the urea solution tank 100 is not inclined on a flatland, light entering through the inspection window 130 is blocked by the light blocking device 160.

Further, FIGS. 13 and 14 illustrate examples in which light is blocked by the light blocking device 160 depending on the inclined state of the urea solution tank 100, and the surface and the level of the surface of the urea solution around the inspection window 130 in the urea solution tank 100 may vary depending on the inclined direction of the urea solution tank 100, as shown in FIGS. 13 and 14.

Here, the angle of rotation of the rotary blinder 165 may be changed as the float 173 is located on the surface of the urea solution, and particularly, as the rotary blinder 165 is rotated within the designated range, the light blocking device 160 may effectively block light within the urea solution tank 100 regardless of the angle of inclination of the urea solution tank 100.

As is apparent from the above description, the present disclosure provides a liquid storage container which has an inspection window for confirming the completely filled state of the liquid storage container with a liquid injected thereinto to improve marketability of a vehicle. The liquid storage container of the present disclosure further inhibits occurrence of a detection error of an optical concentration sensor due to light by using a light blocking device configured to block light entering the liquid storage container through the inspection window.

The disclosure has been described in detail with reference to preferred forms thereof. However, it will be appreciated by those skilled in the art that changes may be made in these forms without departing from the principles and spirit of the present disclosure.

What is claimed is:

1. A liquid storage container comprising:
    a container main body configured to store a liquid;
    an inlet configured to inject the liquid into the container main body therethrough;
    an inspection window installed on the container main body, and configured to allow to check a completely filled state of the container main body with the liquid;
    a concentration sensor configured to detect a concentration of the liquid in the container main body; and
    a light blocking device installed in the container main body, and configured to block light entering through the inspection window.

2. The liquid storage container of claim 1, wherein:
    the concentration sensor is an optical concentration sensor configured to radiate light to the liquid in the main body and then to measure the concentration of the liquid using light that has passed through the liquid; and
    the light blocking device is configured to block light traveling towards the concentration sensor in the main body after entering through the inspection window.

3. The liquid storage container of claim 1, wherein:
    the liquid is a urea solution used in a selective catalytic reduction (SCR) system of a vehicle;
    the main body is a urea solution tank main body configured to store the urea solution in the vehicle; and
    the concentration sensor is a urea quality sensor configured to detect a concentration of urea in the urea solution.

4. The liquid storage container of claim 1, wherein the light blocking device comprises a stationary blinder fixed in a state in which one end thereof is coupled to the inspection window, and configured to extend toward an inside of the container main body and block the light entering through the inspection window.

5. The liquid storage container of claim 4, wherein:
    the stationary blinder is a plate having a shield panel structure,
    the shield panel structure includes: one end fixed to a lower portion of the inspection window, and an upper surface having a semicircular or circular arc-shaped cross-section, and
    the stationary blinder is configured to block light traveling downwards after entering through the inspection window.

6. The liquid storage container of claim 5, wherein liquid passage holes are formed through the stationary blinder and the liquid passes through the liquid passage holes.

7. The liquid storage container of claim 6, wherein shield panels are installed on the stationary blinder and configured to cover the liquid passage holes and inhibit the light entering through the inspection window from passing through the liquid passage holes.

8. The liquid storage container of claim 4, wherein the light blocking device further comprises:
    a rotary blinder having a float configured to move upwards and downwards along a surface of the liquid in the container main body while floating on the surface of the liquid,
    wherein the rotary blinder is rotatably installed on the stationary blinder and configured to: be rotated by the float based on an angle of inclination and a height of the surface of the liquid in the container main body, and block the light entering through the inspection window.

9. The liquid storage container of claim 8, wherein the stationary blinder comprises:
    an inclined part configured to be inclined and have one end coupled to the inspection window; and
    a horizontally extending part extending horizontally from the inclined part,
    wherein the rotary blinder is rotatably coupled to one end of the horizontally extending part.

10. The liquid storage container of claim 8, wherein the rotary blinder comprises:
    a first blinder configured to have one end rotatably hinged to the stationary blinder and to extend from the stationary blinder towards the inside of the main body such that the first blinder blocks light traveling through an upper space of the stationary blinder; and
    a second blinder formed integrally with the first blinder and configured to extend downwards from the first blinder such that the second blinder blocks light passing through an inner passage space of the stationary blinder and light passing under the first blinder.

11. The liquid storage container of claim 10, wherein:
    the first blinder has a plate shape having one side bent at a designated angle, and is configured to extend upwards from a hinge coupling part to the stationary blinder and then to extends laterally; and
    the second blinder is configured to extend downwards from a laterally extending part of the first blinder.

12. The liquid storage container of claim 10, wherein the second blinder is configured to come into contact with an end section of the stationary blinder, and
    when the rotary blinder is rotated relative to the stationary blinder,
    the second blinder comes into contact with the end section of the stationary blinder and closes an end of the inner passage space of the stationary blinder,
    the second blinder is spaced apart from the end section of the stationary blinder and opens the end of the inner passage space of the stationary blinder.

13. The liquid storage container of claim 12, wherein the float is provided integrally with the first blinder.

14. The liquid storage container of claim 10, wherein a stopper is formed at an end of the first blinder that is dose to a hinge coupling part, regulation grooves are formed at a remaining end of the stationary blinder, and when the first blinder is rotated, the stopper is inserted into the regulation grooves, and
    wherein when the rotary blinder is rotated at a predetermined angle relative to the stationary blinder, the stopper is inserted into the regulation grooves and is then engaged with inner ends of the regulation grooves.

15. The liquid storage container of claim 10, wherein a liquid passage hole, configured to pass the liquid therethrough, is formed through the second blinder to pass.

16. The liquid storage container of claim 15, wherein the second blinder is in parallel to an upwardly extending part configured to extend upwards from a hinge coupling part of the first blinder, and the liquid passage hole is formed at a position of the second blinder, wherein the position is blocked by the upwardly extending part of the first blinder.

* * * * *